April 21, 1936. F. E. P. KLAGES 2,038,431
APPARATUS FOR CONTROLLING MOISTURE CONTENT OF MATERIAL
Filed Sept. 4, 1934 3 Sheets-Sheet 1
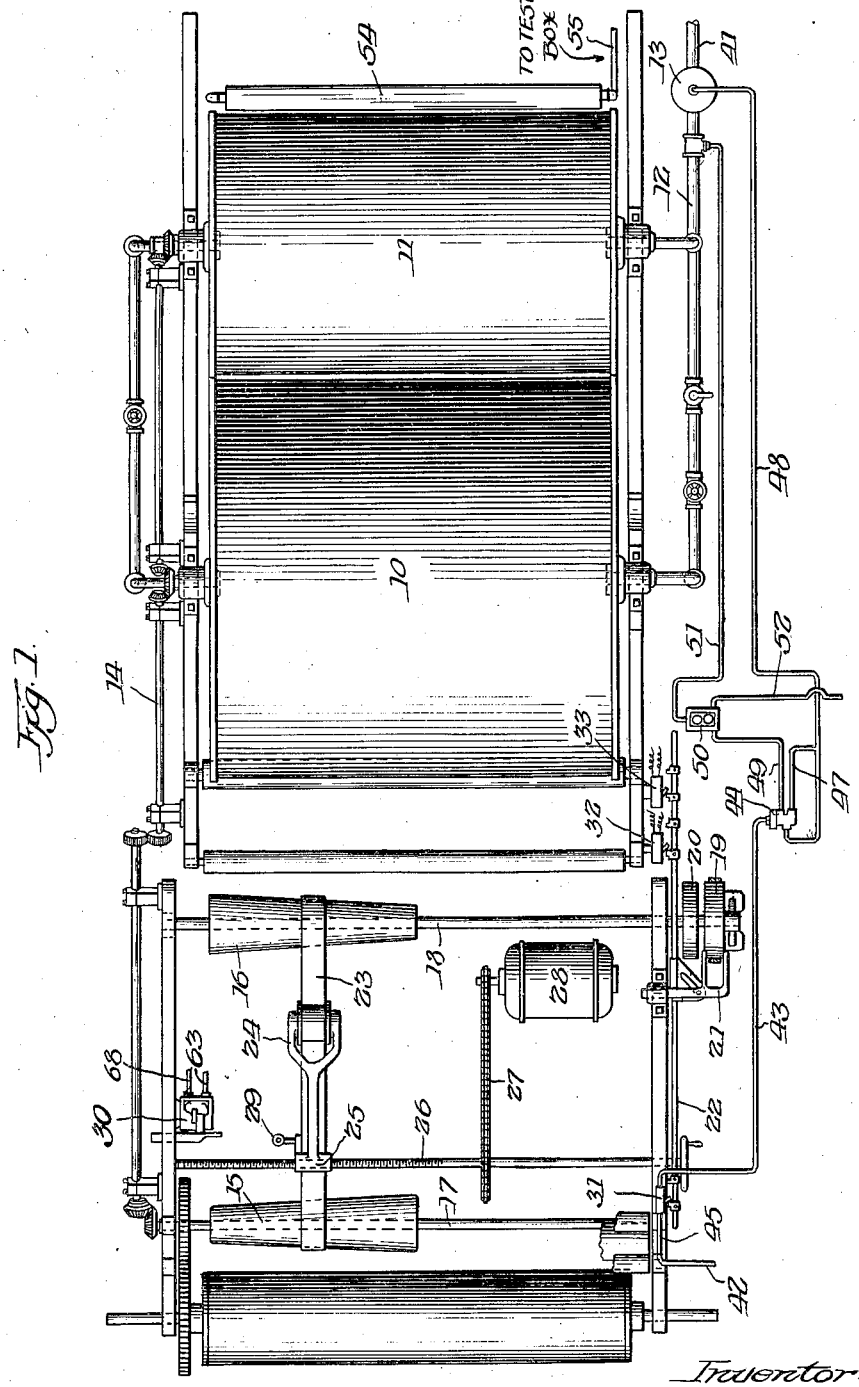

April 21, 1936. F. E. P. KLAGES 2,038,431
APPARATUS FOR CONTROLLING MOISTURE CONTENT OF MATERIAL
Filed Sept. 4, 1934 3 Sheets-Sheet 2
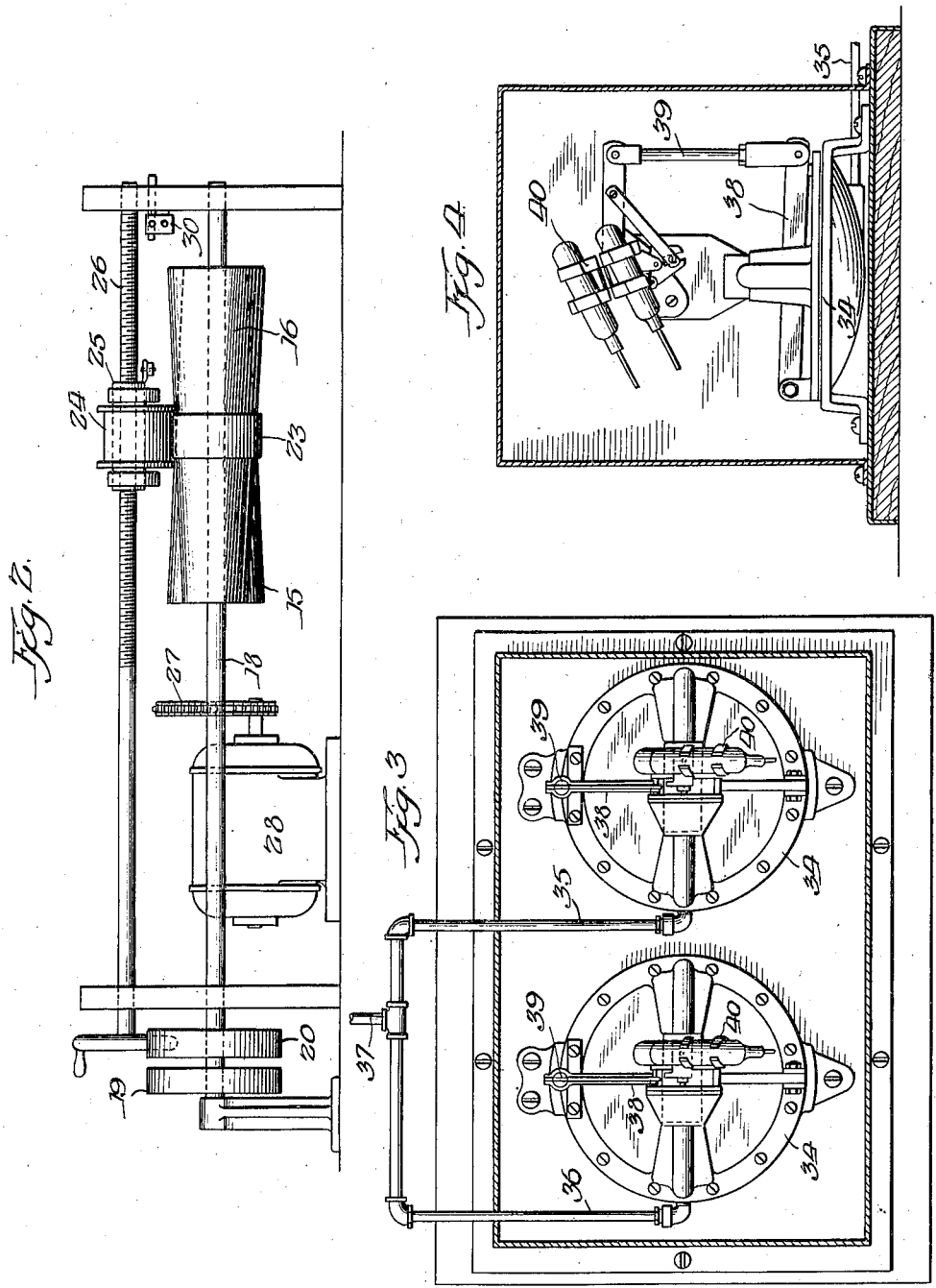

April 21, 1936. F. E. P. KLAGES 2,038,431
APPARATUS FOR CONTROLLING MOISTURE CONTENT OF MATERIAL
Filed Sept. 4, 1934 3 Sheets-Sheet 3
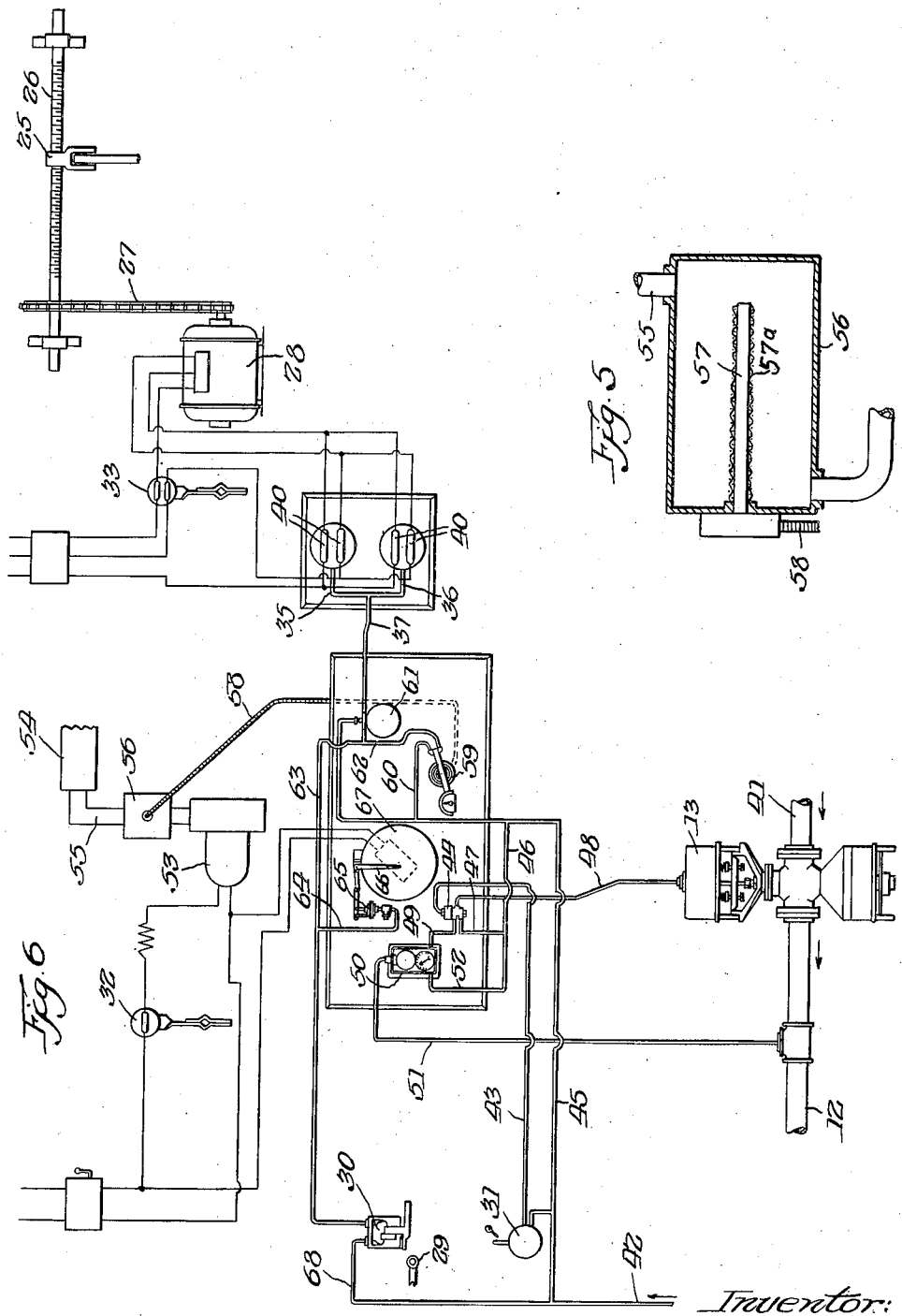

Patented Apr. 21, 1936

2,038,431

UNITED STATES PATENT OFFICE 2,038,431

APPARATUS FOR CONTROLLING MOISTURE CONTENT OF MATERIAL

Frank E. P. Klages, Park Ridge, Ill., assignor to The Powers Regulator Company, Chicago, Ill.

Application September 4, 1934, Serial No. 742,529

12 Claims. (Cl. 34—48)

My invention relates to apparatus adapted to regulate moisture content of yarns, fabrics, paper, etc., as an incident to the production or treatment thereof. The apparatus operates on the principle of maintaining a constant supply of heat to a drum or cylinder over which the material is directed, continuously testing the moisture content of the material, and varying the speed of rotation of the drum or cylinder according to the indicated variations in said moisture content.

This application is a continuation, in part, of my application Serial No. 709,567, filed February 3rd, 1934, and is an improvement on the construction shown in my prior Patent No. 1,633,817, of June 28, 1927.

Broadly stated, the idea of varying the speed of rotation of a drying drum according to variations in the moisture content of material passing over the drum is disclosed in the patent to Kruse, No. 1,926,292, September 12, 1933. This application is, therefore, directed to collateral devices necessary or desirable for use in connection with the described apparatus. The function and purpose of said devices will be pointed out in connection with the subsequent detailed description.

The invention will be more readily understood by reference to the accompanying drawings in which:

Fig. 1 is a plan view of apparatus designed and equipped to operate in the described manner;

Fig. 2 is a partial end elevation of the apparatus shown in Fig. 1;

Fig. 3 is a plan view, with the cover removed, of the air operated reversing switch for the speed changing motor;

Fig. 4 is an end view thereof;

Fig. 5 is a sectional view through the testing box containing the hydro-thermo-sensitive bulb; and Fig. 6 is a diagrammatic view showing the complete operative arrangement.

I have avoided a multiplicity of details in the mechanical drawings, depending on the diagram for a complete illustration of the cooperative relations of the various elements. All of the instrumentalities shown in the diagram are of conventional form, except those that are shown in detail in the mechanical drawings.

In Fig. 1 of the drawings I have illustrated a slasher common in cotton mills, being used for drying the warp after it has been sized. This machine is used merely as an illustration, the invention being applicable to numerous different forms of apparatus as previously stated.

The slasher comprises a frame within which two hollow cylinders, or drums 10—11 are mounted for rotation. Steam is supplied to the drums by the pipe 12 under the control of an air operated steam valve 13.

The drums are rotated by the gearing and shafts indicated generally by the numeral 14, and by the oppositely arranged cones 15—16 carried by shafts 17—18. The latter shaft carries tight and loose pulleys 19—20, cooperating with a driving belt in the usual manner. A belt shifter fork 21 is adapted for manual operation by the rod 22 for the purpose of starting and stopping the rotation of the drums.

A belt 23 extends between the cones 15—16, the belt being adapted to be shifted longitudinally of the cones to vary the speed of rotation of the drums by the yoke 24 carried by a threaded head 25, which engages a threaded shaft 26. A sprocket wheel fixed to the shaft 26 is engaged by a chain 27, connected to the armature shaft of a reversible motor 28.

The head 25 carries a roller 29 arranged in position to operate an air valve 30 at a limit of movement where the highest speed occurs. Under certain conditions of operation such as occur following frequent stops, there is a cumulative speed increase and the belt 23 would be likely to run off the ends of the cones. By operating the air valve 30 under such conditions, a reversal of the movement will be brought about in a manner later to be described.

Mounted adjacent to, and operable by, the belt shifter rod 23 is an air valve 31 and switches 32—33, all so arranged that they are operated to open and closed positions by the movement of the drive belt rod that is used to start and stop the rotation of the drums. An explanation of the function of the valve and switches will be given in the description of the diagram.

The reversing switch shown in Figs. 3 and 4 and in the diagram is air operated and comprises duplicate elements, each having a base 34 carrying a diaphragm adapted to be moved by the air under pressure, the air being admitted through branch pipes 35—36, connected to a common supply pipe 37. Upward movement of the diaphragm causes movement of an arm 38 to the end of which is connected a link 39, which through suitable connections serves to operate a double pole mercury switch 40. These switches are constructed so that the resistance to movement by air pressure permits one switch to close two phases of the motor circuit in order to run the motor in one direction, and then on a further increase in air pressure, open the circuit of these phases so that the motor is stopped, and on a further increase of air pressure, close another selection of two phases which will cause the motor to run in the reverse direction. A reduction of the pressure will bring about a reverse operation of these switches. Thus, by a single air line the reversing switches are operated by changes in pressure in said air line.

Referring now to the diagram, Fig. 6, the operation will be described.

Assume that the slasher is idle and that steam at relatively high pressure, say 90 to 100 pounds, is available in the pipe 41; assume also that air under pressure of approximately 15 pounds is available in the pipe 42. Under those conditions the valve 31 has been moved by the rod 22 to an open position. Air is then delivered through the pipe 43 to the diaphragm valve 44. This operates a three way valve so that air under pressure of the full 15 pounds passes from the pipes 45—46—47 to the delivery pipe 48, connected to the diaphragm in the air operated steam valve 13, thus shutting off the steam to the drums. I may prefer to arrange the valve by a suitable adjustment to supply a very small quantity of steam to the drums, even under the conditions stated, but for the purpose of my description we may assume that the steam is entirely shut off.

When the slasher is to be started, the belt shifter rod 22 is moved, thereby shifting the drive belt from the loose to the tight pulley and starting the drums into rotation. The movement of the rod 22 serves to actuate the valve 31, and the switch 32—33. The movement of the valve 31 serves to place it in leaking position, whereby the pressure in the pipe 43 is reduced and the diaphragm valve 44 is moved to a position to close the passage for the high pressure air direct to the steam valve 13, and to open the passage through the pipe 49 to the pipe 48. The pipe 49 is connected to a reducing valve 50, under the control of pressure through a pipe 51, connected on the delivery side of the steam pipe. Air under full pressure is received by the reducing valve through the pipes 46—52. The reducing valve will be set to provide for a supply of steam at a uniform pressure, say 10 pounds.

The movement of the rod 22 serves to close the switch 32, which as indicated in Fig. 6, may be of the mercury type, and to energize an exhaust fan motor 53. The movement of the rod 22 likewise closes the mercury switch 33, which preferably is arranged to make or break two phases of the reversible motor 28, the closing of the switch placing the motor in condition to be energized by the automatic control about to be described.

When the exhaust fan is started air is drawn from the surface of the material on the drum 11, into the open sided receiver 54, through pipe 55, to the test box 56 shown in detail in Fig. 5. Within the box is a thermostatic bulb 57 which is covered with a knitted or woven fabric sleeve 57ª, which is absorbent, and as a result of this construction the thermostatic bulb is affected not only by the heat in the air which passes over it, but also by the super-heat of vapor carried by that air. With this construction I secure the function of testing the moisture content of the air and vapor mixture which is drawn through the box, and I, therefore, secure a very accurate and immediate response to slight variations in humidity of the air passing through the testing box. Connected to the bulb by a pipe 58 is an instrument 59 of a common type known as a vapor tension thermostat, and is so arranged that as pressure in the bulb increases the thermostat will permit air from the pipe 45 and branch pipe 60 to pass to a relay valve 61. This relay valve is connected to the air pipe 45, and to the reversing valve pipe 37, and is so arranged that for each one pound increase in pressure delivered by the thermostat, three pounds' pressure is delivered to the reversing valve. Thus slight changes in the super-heated vapor content of the air, as reflected by the testing box bulb are augmented by the relay to cause a change in the speed of rotation of the drums.

Also connected to the return line 62 from the thermostat by branch pipes 63—64 is a diaphragm valve 65, operatively connected to recording arm 66 of a time-controlled recording device 67. This device, connected as indicated, provides a graphic record of the operation.

Also connected to the pipe 63 is an air valve 30, there being also a pipe connection 68 to the high pressure air pipe 42. As before described, in case the speed changing belt shifter reaches its limit of high speed the valve 30 will be opened, permitting the high pressure air to enter the return line 62, and to immediately deliver air at high pressure to the reversing switch, thus causing a reversal of the speed changing motor 28. Of course, as soon as the speed is changed the roller 29 is retracted, the valve 30 will be restored to its original position and control of the reversing switch by the thermostat will be resumed.

Obviously many of the instrumentalities described herein may be varied and substituted by those having similar functions, and I do not wish to be limited, except as indicated in the appended claims.

The form of the apparatus employed for testing the moisture content of the air withdrawn from the surface of the material that is being treated is unimportant so far as the claims hereinafter submitted are concerned. Therefore, it should be understood that whenever in the specification and claims I refer to means for testing the moisture content of the material under treatment I contemplate any apparatus that is suitable for that purpose; within that definition is included, the common wet bulb testing means, the electrical resistance apparatus, and the vapor super-heat testing bulb shown herein, the latter being used because of its greater accuracy and sensitiveness in testing air-vapor mixtures that approximate saturation.

I claim:

1. In combination, a drum over which material is adapted to travel, means for rotating the drum, means for supplying heat to said drum, automatic means for varying the speed of the drum according to the moisture content of the material passing over the drum, means for interrupting the rotation of the drum, and means connected to, and operable by said interrupting means for shutting off the supply of heat to said drum during the period of interruption of rotation thereof.

2. In combination, a rotatable hollow cylinder over which material is adapted to travel, means for supplying heat to said cylinder for the purpose of removing moisture from said material, automatically operating means for varying the speed of rotation of the cylinder according to the moisture content of the material after passing over the cylinder, manually operable means for stopping the rotation of the cylinder, and means actuated by the said stopping means for interrupting the normal supply of heat to said cylinder during the period of stoppage of rotation thereof.

3. In combination, a drum over which material is directed, means for supplying heat to said drum, means for rotating the drum, suction means for withdrawing from the surface of said material adjacent to said drum moisture laden air, means for testing the moisture content of said air, means operated by said testing means for varying the rate of rotation of said drum according to variations in said moisture, manually operated means for interrupting the rotation of said drum and means actuated by said interrupting means for discontinuing the operation of said suction means during the period of stoppage of said drum.

4. In means for controlling the moisture content of materials, the combination of a rotating heated drum over which said material is conducted, a motor driven fan for continuously withdrawing moisture laden air from said material, means for testing the moisture content of said air and for varying the speed of rotation of said drum according to variations in said moisture content, means for stopping the rotation of the drum and means connected to and operated by said stopping means for interrupting the operation of said fan during the stoppage of operation of said drum.

5. In combination, a hollow cylinder, adapted to be heated and rotated, and over which material to be dried is directed, means for testing the moisture content of said material, means for changing the speed of rotation of said cylinder, a reversible motor for operating the speed changing mechanism, means operated by said testing means for controlling said motor, means for interrupting the rotation of said cylinder and means connected to and operated by said interrupting means for stopping the operation of said speed changing motor when said cylinder is stopped.

6. In combination, a rotated, heated drum over which material to be dried is directed, means for continuously testing the moisture content of said material, said means including a moisture sensitive element and an instrument operated thereby, said instrument controlling a fluid under pressure, means operated by said fluid for varying the speed of rotation of said drum, said last named means including mechanism for intermittently effecting movement of the speed-varying mechanism in two directions to effect faster or slower rotation of said drum, a controlling element for securing the required movement of said mechanism, a power connection between said controlling element and said instrument, and a relay in said power connection whereby the force generated in said instrument is augmented in its action on said controlling element.

7. In combination, a rotated, heated drum over which material to be dried is directed, means for continuously testing the moisture content of said material, said means including a moisture sensitive element and an air-operated vapor-tension thermostat, means for varying the speed of rotation of said drum, said means including a reversible motor, a reversing switch adapted for operation by air under pressure and connected to said thermostat, and a relay in said connection adapted to augment the pressure developed by said thermostat as applied to said reversing switch.

8. In combination, a rotated, heated drum over which material to be dried is directed, means for continuously testing the moisture content of said material, said means including a moisture sensitive element and an air-operated vapor-tension thermostat, means for varying the speed of rotation of said drum, said means including a reversible motor, a reversing switch adapted for operation by changes in pressure in an air line connected to said thermostat, and a relay in said air line adapted to augment the pressure developed by said thermostat as applied to said reversing switch.

9. In combination, a rotated, heated drum over which material to be dried is directed, means for continuously testing the moisture content of said material, said means including a moisture sensitive element and an instrument operated thereby, said instrument controlling a fluid under pressure, means for varying the speed of rotation of said drum, said last named means including mechanism for intermittently effecting movement in two directions, a controlling element for securing the required movement of said mechanism, a power connection between said controlling element and said instrument, a time-controlled recording device in said power connection, and a relay in said power connection whereby the force generated in said instrument is augmented in its action on said controlling element.

10. In combination, a rotated, heated drum over which material to be dried is directed, means for continuously testing the moisture content of said material, said means including a moisture sensitive element and an instrument operated thereby, said instrument controlling a fluid under pressure, means for varying the speed of rotation of said drum, said last named means including mechanism for intermittently effecting movement in two directions, a controlling element for securing the required movement of said mechanism, a power connection between said controlling element and said instrument, a relay in said power connection whereby the force generated in said instrument is augmented in its action on said controlling element, and means operated by said mechanism at one limit of movement thereof for effecting a reversal of operation of said mechanism regardless of the action of said instrument thereon.

11. In combination, a steam heated, rotated drum over which material to be dried is directed, means for continuously testing the moisture content of said material and for varying the speed of rotation of said drum according to variations in said moisture content, a source of steam at relatively high pressure, an air-controlled steam valve in the delivery line for said steam to said drum, a source of air under pressure for operating said steam valve, a reducing valve interposed in said air line and operated by the pressure on the delivery side of said steam valve for maintaining a uniform pressure of steam in said drum.

12. In combination, a steam heated, rotated drum over which material to be dried is directed, means for continuously testing the moisture content of said material and for varying the speed of rotation of said drum according to variations in said moisture content, a source of steam at relatively high pressure, an air-controlled steam valve in the delivery line for said steam to said drum, a source of air under pressure for operating said steam valve, a reducing valve interposed in said air line and operated by the pressure on the delivery side of said steam valve for maintaining a uniform pressure of steam in said drum, and means operated manually with the means for stopping the rotation of the drum for by-passing the air around said reducing valve and shutting off said steam valve.

FRANK E. P. KLAGES.